March 2, 1926.
R. OPPENHEIM
ELECTRIC BATTERY
Filed Sept. 6, 1924
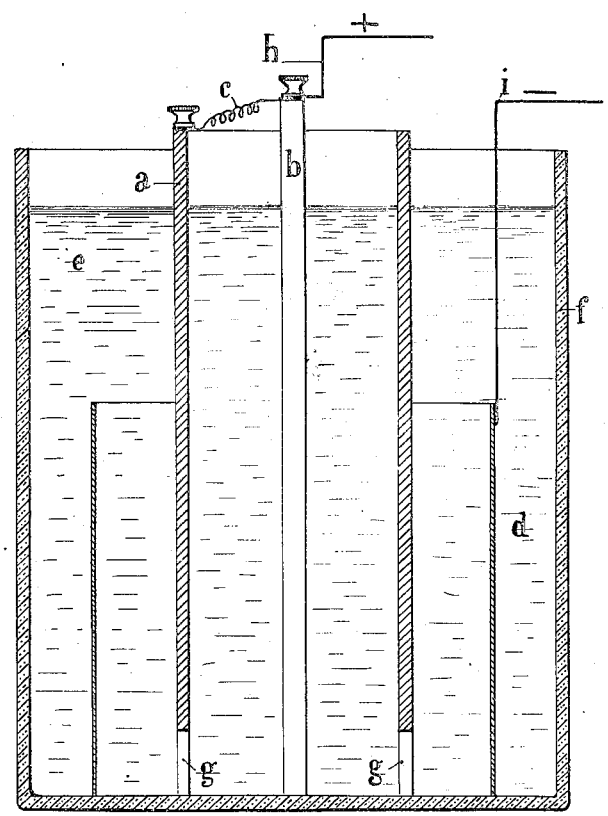
Inventor
R. Oppenheim
By Marks & Clerk
Attys.

Patented Mar. 2, 1926.

1,574,845

UNITED STATES PATENT OFFICE.

RENÉ OPPENHEIM, OF LEVALLOIS-PERRET, FRANCE, ASSIGNOR TO SOCIETE ANONYME LE CARBONE, OF LEVALLOIS-PERRET, SEINE, FRANCE.

ELECTRIC BATTERY.

Application filed September 6, 1924. Serial No. 736,363.

*To all whom it may concern:*

Be it known that I, RENÉ OPPENHEIM, of 12 and 33 Rue de Lorraine, Levallois-Perret, Seine, France, engineer, citizen of the Republic of France, have invented Improvements in or Relating to Electric Batteries, of which the following is a full, clear, and exact description.

The present invention relates to electric batteries, and its object is to provide a battery capable of rapid and constant depolarization and having a capacity superior to that of batteries known at the present time.

The battery of this invention is characterized essentially by the fact that its positive electrode is closed by a porous conductive tubular body impermeable by the electrolyte and permeable by gases, and by the fact that the inner and outer faces of this tubular body are in contact with the liquid or solid electrolyte. This positive electrode can be completely immersed in the electrolyte, or may extend above the latter in such a manner that a part of the surface of the electrode may be in contact with the external atmosphere.

This positive electrode may be constituted, for instance, by a piece of porous carbon, such as wood charcoal, of tubular shape and by means of suitable treatment rendered impermeable by liquids whilst retaining its property of being permeable by gases.

Due to its special constitution this positive electrode plays the part of a dialyzer, and its effect (in case the electrolyte releases several gases such, for example, as hydrogen and ammonia in cases where use is made of hydrochlorate of ammonia) is to retain the ammonia and to allow the hydrogen to pass with a reduced speed in such a manner that this latter, upon its arrival at the centre of the electrolyte, contained in the inner space of the electrode, may be released and rise to the surface of this electrolyte.

Preferably the positive electrode comprises, furthermore, a central conductor formed, for instance, by a rod of retort carbon. This central conductor extends into the electrolyte in the interior of the hollow body described above, and is placed in short circuit with this latter. In this case, the particles of gas (hydrogen in the stated example) which, after having traversed the porous body, should have too great a speed to enable them to rise and release themselves at the surface of the electrolyte, collect upon the central conductor. Between the central conductor and the porous body there is then formed an electric couple in the opposite direction the effect of which is to effect the depolarization of the central conductor.

The central conductor could also be constituted by a porous solid or hollow body, of the same substance as the hollow body described above and rendered impermeable in the same way as the latter.

It should be noted that in the battery forming the subject matter of the invention, the hydrogen released during the course of the reaction, as it does not remain in the porous positive electrode, cannot give rise to any chemical combination with the oxygen of the air which may be contained in this electrode. Under these conditions the electrode remains dry and, due to this fact, retains its dialyzing properties.

The negative electrode is constituted in the ordinary way as, for example, by a sheet of zinc surrounding the positive electrode.

In order to give a perfectly clear idea of the invention I will now describe a method of making the battery forming the subject matter of the invention, with reference to the accompanying drawing which shows this battery in vertical section.

Referring to the drawing the positive electrode of the battery comprises a conductive cylinder $a$ of the porous type, of charcoal for example, of tubular form and rendered impermeable by liquids, and a pencil $b$ of carbon, retort carbon, graphite, charcoal or the like inserted into the interior of the cylinder $a$. These two elements $a$, $b$, forming the positive electrode of the battery, are short circuited externally by a conductor $c$ and may also be short circuited in the interior of the battery.

The porous tubular carbon $a$ may be rendered impermeable to liquids by one of the following processes:

The porous carbon to be made impermeable is plunged into a solution of paraffine obtained by dissolving in a waterbath 50 grams paraffine in 6 litres of benzine; this immersion must be of short duration, say 6 to 10 seconds for example. Preferably the solvent is afterwards evaporated by stoving the carbon at a temperature not exceeding 60° C., approximately during a period of 20 to 24 hours. The porous carbon thus treated possesses the property of being impermeable by liquids whilst remaining permeable by gases. The same result may be obtained by submitting the porous carbon to an atmosphere highly charged with heavy hydrocarbons, for example, allowing the porous carbon to remain for about 12 hours in the flues of a continuous tar distilling furnace; the duration of the stay of the porous carbon in the hydrocarbon atmosphere will vary according to the richness of the atmosphere of the flue in heavy vapours.

The negative electrode is formed, in the usual way, of a sheet of zinc $d$ surrounding the positive electrode and the electrolyte $e$ is composed of an ordinary solution of hydrochlorate of ammonia.

The electrodes and the electrolyte are contained in a receptacle $f$ of material not subject to attack by the hydrochlorate of ammonia and the ammoniacal solutions.

The tubular carbon $a$ has, at its lower part, recesses or perforations $g$ permitting passage of the electrolyte from the exterior to the interior of this tubular carbon. The upper part of tubular carbon emerges above the electrolyte and is in contact with the outer air.

The method of operation of this battery is as follows:

When the two poles $h$, $i$ are connected externally across a resistance, the solution of hydrochlorate of ammonia attacks the zinc according to the known reaction $$2NH_4Cl + Zn = ZnCl_2 + 2NH_3 + H_2$$

The chloride of zinc falls by gravity to the bottom of the vessel $f$ and the two gases, hydrogen and ammonia, or more correctly the mixture of these two gases, is transported to the porous positive body $a$.

The electric transportation of this gaseous mixture to the porous body $a$ may be compared with the passage under pressure of a mixture of two gases of different densities through a porous diaphragm in suchwise that, by reason of the Graham law, the hydrogen and the ammonia filter through the porous partition of the tubular body $a$ at speeds inversely proportional to the square roots of the densities.

The hydrogen passes, at a speed proportionate to $$\frac{1}{\sqrt{1}} = 1$$

and the ammonia passes, on the contrary at a speed of proportionately $$\frac{1}{\sqrt{17}} = 0.245.$$

The hydrogen therefore traverses the porous partition of the tubular carbon $a$ at a speed much greater than that of the ammonia. On the other hand as the porous carbon has an affinity 80 times greater for ammonia than for hydrogen, it follows that the ammonia is retained in the pores and the capillary ducts of the tubular carbon $a$ and that the hydrogen alone passes into the electrolyte contained in the internal space of this carbon $a$. Upon arrival in this inner space, containing electrolyte, the molecules of hydrogen are no longer guided by the current of electrolyte and, furthermore, they encounter a resistance to their forward movement offered by the electrolyte. The result is that these molecules are only subjected to the force of gravity and consequently rise through the electrolyte and are released into the atmosphere.

It is, nevertheless, possible that some of the hydrogen will attach itself to the central carbon $b$, but this deposit cannot destroy the good working of the battery for the two following reasons:

(1) The tubular porous body $a$, which constitutes the principal element of the positive electrode is, as has been stated above, free from hydrogen.

(2) The tubular porous body $a$, saturated with ammonia, and the central carbon $b$, covered with hydrogen, both immersed in the electrolytic solution and short circuited, form a secondary gas battery the effect of the working of which, as will be explained below, is to complete the depolarization of the main battery.

As a matter of fact in this secondary gas battery the porous body $a$ forms the positive electrode and the central carbon $b$ forms the negative electrode. These two electrodes, which are short circuited electrolyze the solution of hydrochlorate of ammonia comprising the electrolyte.

In the course of the working of this secondary gas battery the ammonia, which saturates the porous body $a$, comes into contact with the central carbon $b$, whilst the hydrogen which covers this latter becomes detached therefrom and adheres to the porous body $a$. There is thus produced in the electrolyte contained inside the tubular body $a$, a countercurrent of hydrogen which reduces the speed of the molecules of hydrogen which pass from the tubular body $a$ to the central carbon $b$ in such a manner that these molecules, the speed of which is thus annulled, rise to the surface of the electrolyte and are released into the atmosphere. This device, therefore, ensures the depolarization of the central carbon $b$ and the release of the hydrogen which has traversed the tubular body $a$.

On the other hand the electrolyte of the hydrochlorate of ammonia by the action of the auxiliary gas battery $a$, $b$, affects the release of chlorine, hydrogen and ammonia. The chlorine goes to the central carbon $b$, which plays the part of the negative and combines with the ammonia which has been conveyed thereto as described above whilst reconstituting the hydrochlorate of ammonia; the electrolyte is, consequently, thus regenerated.

The hydrogen and the ammonia are deposited upon the tubular porous body $a$. The hydrogen not being absorbed by porous body rises to the surface of the electrolyte and is released into the air and the ammonia contributes to supersaturate the porous body $a$.

Thus the principal battery is constantly depolarized, and, owing to this fact, retains, under a definite output, a constant voltage and has a capacity much superior to that of batteries with chemical depolarization.

It is to be understood that the method of obtaining the desired result described above, and that the form, the dimensions and the details for the constitution or construction of the present battery system may be varied.

Claims:

1. A positive electrode for electric batteries formed of a porous conductor substance, of tubular shape, the outer and inner surfaces being intended to be in contact with the electrolyte, said porous substance being rendered impermeable to liquid while remaining permeable to gases, so as to perform the function of a dialyzer.

2. An electric battery including a positive electrode formed of a porous conductor substance of tubular form rendered impermeable to liquids while remaining permeable to gases, said porous electrode having openings therein whereby the outer and inner faces thereof are in contact with the electrolyte, and a negative electrode formed by a sheet of zinc rolled in the form of a cylinder so as to surround the tubular positive electrode.

3. An electric battery in which the positive electrode comprises: a tubular porous conductive body impermeable by the electrolyte and permeable by gases and the inner and outer faces of which are in contact with the electrolyte,—and a central conductive rod immersed in the electrolyte contained within the said tubular porous body and short-circuited with the latter.

4. An electric battery in which the positive electrode comprises:—a tubular body of charcoal,—means for rendering the said porous body impermeable to the electrolyte, whilst preserving for the same its permeability by gases,—openings provided in this tubular porous body so that the inner and outer faces of the latter are in contact with the electrolyte,—and a central rod of carbon immersed in the electrolyte contained in the interior of the said tubular body and short circuited with the latter.

5. An electric battery comprising: a tubular porous body of charcoal constituting the positive electrode,—means for rendering the said porous body impermeable by the electrolyte, whilst preserving for the same its permeability by gases,—openings provided in this tubular body so that the inner and outer faces of the latter are in contact with the electrolyte,—a central rod of retort carbon immersed in the electrolyte contained in the interior of the tubular porous body and short circuited with the latter,— and a sheet of zinc constituting the negative electrode and wound about the positive electrode.

6. An electric battery in which the positive electrode comprises a porous tubular body, a conductor impermeable to the electrolyte and permeable to gases, and having the outer and inner surfaces thereof in contact with the electrolyte, and a tubular porous conductor rod impermeable to the electrolyte and permeable to the gases, the said tubular rod immersing in the electrolyte container inside the porous tubular body and being short circuited with the latter, said tubular rod having openings therein whereby the outer and inner surfaces of this latter are in contact with the electrolyte.

7. An electric battery in which the positive electrode comprises, a tubular body of wood charcoal, means to render said tubular body impermeable to the electrolyte while keeping it permeable to the gases, said tubular body having openings therein whereby the outer and inner faces thereof are in contact with the electrolyte, and a tubular rod of wood charcoal, means to render this tubular rod impermeable to the electrolyte while retaining its permeability to the gases, said tubular rod being immersed in the electrolyte container inside the tubular body and being short circuited with the latter, said tubular rod having openings therein whereby the outer and inner surfaces of this latter are in contact with the electrolyte.

The foregoing specification of my "improvements in or relating to electric batteries" signed by me this 22nd day of August, 1924.

RENÉ OPPENHEIM.